E. FORNEY.
HAND TRUCK.
APPLICATION FILED MAY 11, 1917.

1,241,366.

Patented Sept. 25, 1917.
2 SHEETS—SHEET 1.

Inventor
Emanuel Forney
By W. E. Dunlap
Attorney

E. FORNEY.
HAND TRUCK.
APPLICATION FILED MAY 11, 1917.
1,241,366.
Patented Sept. 25, 1917.
2 SHEETS—SHEET 2.
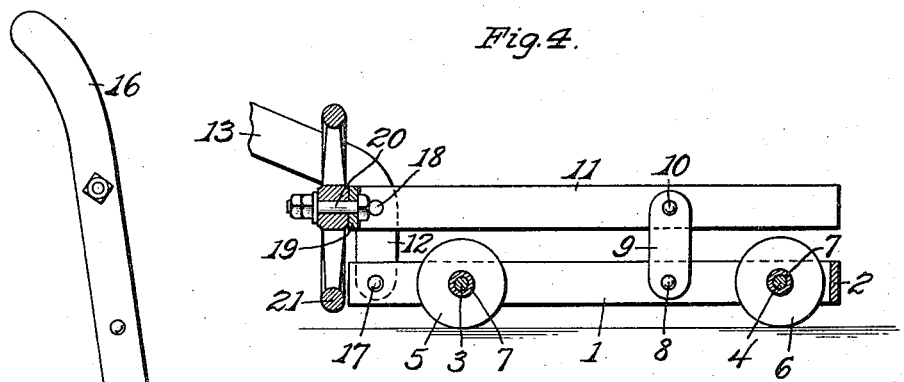
Fig. 4.
Fig. 3.
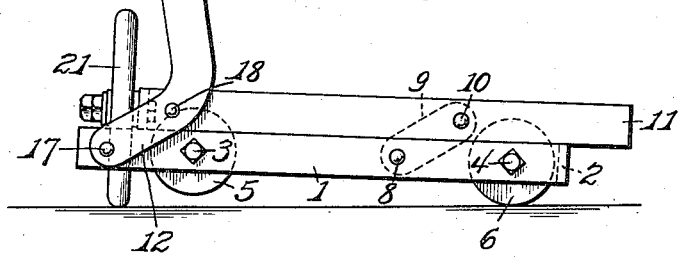

UNITED STATES PATENT OFFICE.

EMANUEL FORNEY, OF EVERETT, PENNSYLVANIA.

HAND-TRUCK.

1,241,366.   Specification of Letters Patent.   Patented Sept. 25, 1917.

Application filed May 11, 1917. Serial No. 167,907.

*To all whom it may concern:*

Be it known that I, EMANUEL FORNEY, a citizen of the United States of America, and resident of Everett, county of Bedford, and State of Pennsylvania, have invented certain new and useful Improvements in Hand-Trucks, of which the following is a specification.

This invention relates broadly to hand-trucks, and more particularly to a heavy-duty truck of that type which embodies an elevatable frame or platform.

The primary object of the invention is to provide a simple, durable and comparatively inexpensive construction of truck for transporting heavy articles and designed for use on factory floors, loading platforms and the like, said truck being of a hand-propelled type embodying an elevatable frame or platform and having a simple and effective lever arrangement whereby the raising and lowering of said frame with heavy loads resting thereon may be accomplished with a minimum of manual effort.

A further object is to provide a truck of a hand-propelled type wherein the handle which affords means for propulsion also constitutes the lifting mechanism, the form and arrangement of parts being such that said handle occupies its normal operating position when the frame or platform is disposed in elevated position.

A still further and extremely important object of the invention is to provide a truck of the character mentioned which may be readily shifted in lateral directions for changing the direction of its travel, or may be turned on a minimum of floor space.

With these and other objects in view, the invention resides in the features of construction, arrangement of parts and combinations of elements which will hereinafter be exemplified, reference being had to the accompanying drawings, in which—

Fig. 3 is a side elevation, showing the platform in lowered position and the various parts in position for turning or laterally shifting the truck; and—

Fig. 4 is a section on line 4—4, Fig. 1.

Referring to said drawings, in which like designating characters distinguish like parts throughout the several views—

Figure 1:
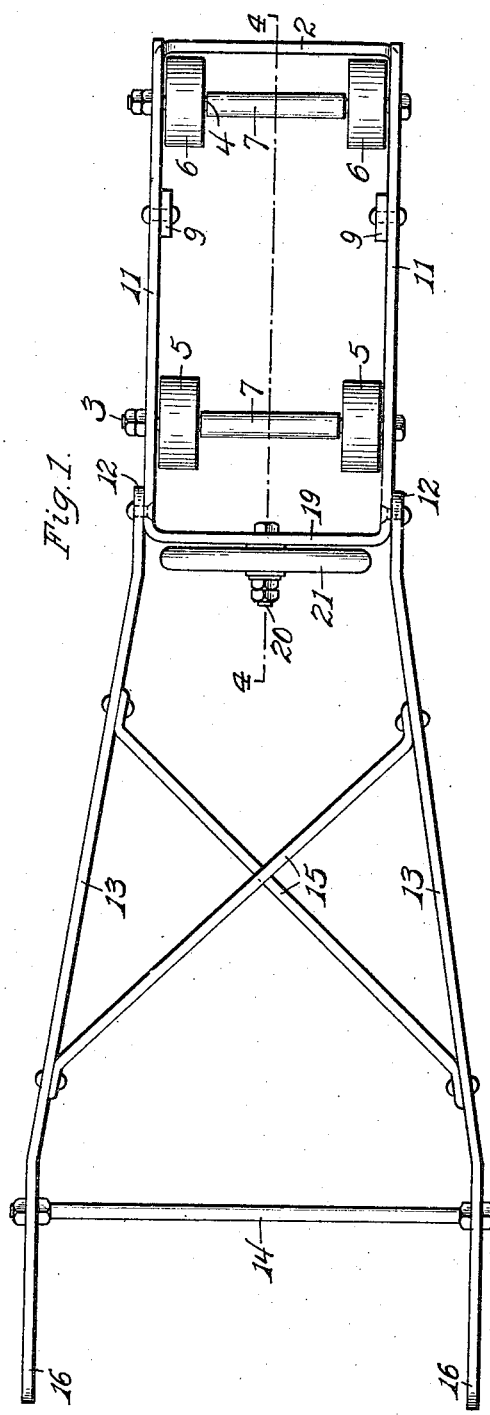
Figures 1 and 2 are, respectively, a top plan view and a side elevation of the invention with the platform elevated.

1 indicates the side members and 2 a transverse end member of a main frame which, as herein depicted, is formed of a single piece of metal bent into approximately U-shape. Said frame is mounted upon axles 3 and 4 which have wheels or rollers 5 and 6, respectively, journaled thereon. As herein shown said wheels or rollers are located inside the confines of the frame and are held in spaced relation close to said sides by interposed axle-embracing lengths of pipe 7 having their ends in abutting relation to said wheels or to the hubs of the latter. While the specific axle and wheel assemblage or arrangement described provides for a simple, inexpensive and otherwise advantageous construction, the same is herein employed merely for illustrative purposes, and I am not, therefore, to be understood as limiting myself to said construction and arrangement.

Pivotally mounted upon pivot pins or rivets 8 carried by the side members 1 of the main frame at an appropriate distance from the front end thereof are the lower ends of a pair of oppositely disposed links 9 which have their upper ends pivoted upon pins or rivets 10 carried by side members 11 of an elevatable frame which is located over said main frame and which preferably has the same dimensions as said main frame so that when in its lowered position it will rest directly upon the latter, as shown. Said elevatable frame is designed for carrying a body or bed of any desired type and constitutes a platform upon which are received the loads to be transported. The links 9 are made of such length that, in their upright position, they support the platform at an appropriate level.

Figure 2:
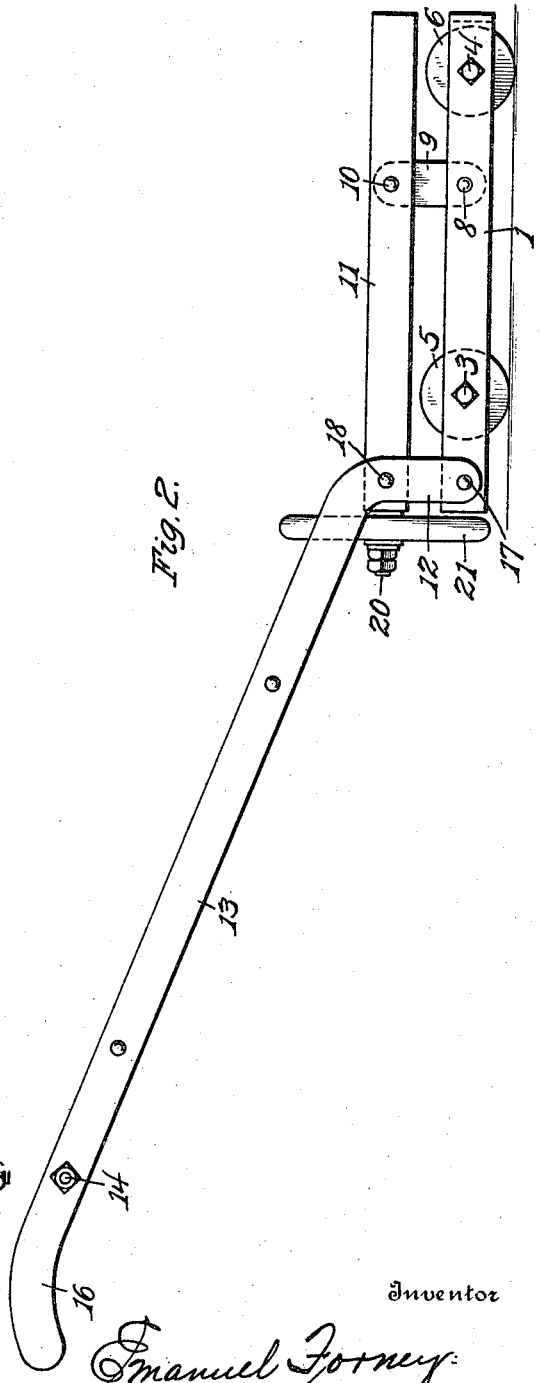

Disposed adjacent to the rear end of the main frame to coöperate with said links 9 are angularly disposed arms 12 formed on the front ends of approximately parallel levers 13 which are rigidly connected, as by a transverse rod 14 and cross-braces 15. Said levers constitute the side members of a handle, hereinafter termed a push-handle, by means of which the truck may be pushed or pulled by hand, said members having hand-grip portions 16 at their outer ends. Said angularly disposed arms 12 form such an angle with the bodies of said side members or levers 13 that, when they assume upright positions, said side members incline upward to a convenient height, as is best illustrated in Fig. 2. The lower ends of said arms 12 are pivotally mounted upon pins or rivets 17 carried by the side members 1 of the main frame, and the rear end of the elevatable platform is mounted upon pivot pins or rivets 18 carried by said arms adjacent to the upper ends of the latter—that is, adjacent to the angle which defines said arms—the distance between the pins or rivets 17 and 18 being the same, or substantially the same, as that between the link-carrying pins or rivets 8 and 10 so that the elevation of the platform above said frame will be uniform throughout.

The platform frame is herein shown as of U-shape corresponding to the main frame, but said frames are disposed in reverse positions—that is, the transverse end member 19 of the platform frame is disposed at the rear end of the truck in a position overlying the open end of the main frame—for a purpose which will now be made apparent.

Journaled upon a pin, bolt, or stub-shaft 20 mounted in and projecting rearward from the said transverse member 19 of said platform frame at a point midway between the ends of said member is a transversely disposed wheel 21 which has such a diameter that, when the platform is elevated somewhat, it is elevated from, or clears, the floor upon which the truck wheels 5 and 6 rest, and also that, in the lowering of said platform, it will engage the floor before a seating position with respect to the main frame is reached by said platform. Thus, as will be obvious, the said platform will not seat upon said main frame until and unless the rear end of the latter is elevated to platform-meeting position wherein its rear supporting wheels 5 are raised from the floor. Such elevation of the rear end of the main frame may be accomplished by manually raising the push handle to the substantially upright position shown in Fig. 3, or the weight of the platform, especially when loaded, may obviously be such as to automatically effect such elevation, the angularly disposed arms 12 of the push handle, when inclined to the positions assumed at the time the wheel 21 seats upon the floor, affording effective leverage.

As is manifest, a relatively small force applied by hand to the long lever constituted by the push handle is effective for elevating the platform even when the latter is heavily loaded. Further, when said platform is raised to the limit, a very slight downward pressure upon said push handle will suffice to maintain said position.

When it is desired to turn or change the direction of travel of the truck, the said push handle is elevated to lower the wheel 21 upon, and to elevate the truck wheels 5 from, the floor, whereupon the rear end of the truck may be readily swung laterally to any extent desired, traveling upon said wheel.

What is claimed is—

1. In an elevating truck, a wheeled main frame, an elevatable platform frame mounted upon said main frame, means for elevating said platform frame, and a transversely disposed wheel carried by the rear end of said platform frame and adapted to support the rear ends of both frames when the platform frame is in lowered position.

2. In an elevating truck, a wheeled main frame, an elevatable platform frame mounted upon said main frame, means for elevating said platform, said means including a push handle, and a transversely disposed wheel carried by the rear end of said platform frame, said wheel being supported clear of the floor when said platform is at the upper limit of its movement and being adapted, when said platform is at the lower limit of its movement, to seat upon the floor and to support the rear ends of said frames.

3. In an elevating truck, a wheeled main frame, a platform frame disposed over and elevatable with respect to said main frame, pivoted elevating links interposed between said frames adjacent to the front ends of the latter, a push handle comprising parallel side members having angularly disposed ends fulcrumed on said main frame adjacent to the rear end of the latter and having the rear end of said platform frame pivotally supported thereon, said handle when in upraised position permitting said platform frame to seat upon said main frame and accomplishing the elevation of the former when moved to its operating position, and a transversely disposed wheel carried by the rear end of said platform frame and adapted to support the rear ends of said frames when the platform frame is in lowered position.

4. In an elevating truck, a wheeled main frame, a platform frame disposed over and elevatable with respect to said main frame, pivoted elevating links interposed between said frames adjacent to the front ends of the latter, a push handle comprising parallel side members having angularly disposed ends fulcrumed on said main frame adjacent to the rear end of the latter and having the rear end of said platform frame pivotally supported thereon, said handle when in upraised position permitting said platform frame to seat upon said main frame and accomplishing the elevation of the former when moved to its operating position, and a transversely disposed wheel carried by the rear end of said platform frame and adapted to support the rear end of said platform frame, said wheel being supported clear of the floor when said platform is at the upper limit of its movement and being adapted to seat upon the floor and to support the rear ends of both frames when said platform frame is at the lower limit of its movement.

5. In an elevating truck, a wheeled main frame, a platform frame disposed over and elevatable with respect to said main frame, pivoted elevating links interposed between said frames adjacent to the front ends of the latter, a push handle comprising parallel side members having angularly disposed ends fulcrumed on said main frame adjacent to the rear end of the latter and having the rear end of said platform frame pivotally supported thereon, said handle when in upraised position permitting said platform frame to seat upon said main frame and accomplishing the elevation of the former when moved to its operating position, and a transversely disposed wheel carried by the rear end of said platform frame, said wheel being supported clear of the floor when said platform is at the upper limit of its movement and being adapted, when said platform frame is at the lower limit of its movement, to seat upon the floor and to support the rear ends of said frames, together with the rear wheels of the main frame.

6. In an elevating truck, a wheeled main frame, a platform frame disposed over and elevatable with respect to said main frame, pivoted elevating links interposed between said frames adjacent to the front ends of the latter, a push handle comprising parallel side members having angularly disposed ends fulcrumed on said main frame adjacent to the rear end of the latter and having the rear end of said platform frame pivotally supported thereon, said handle when in upraised position permitting said platform frame to seat upon said main frame and accomplishing the elevation of the former when moved to its operating position, and a transversely disposed wheel carried by the rear end of said platform frame, said wheel being supported clear of the floor when said platform is at the upper limit of its movement and being adapted, when said platform frame is at the lower limit of its movement, to seat upon the floor and to support the rear end of said platform frame and also, through the intermediacy of said angularly disposed ends of the push handle, to support the rear end of said main frame with the rear wheels of the latter elevated clear of the floor.

7. In an elevating truck, a wheeled main frame, an elevatable platform frame mounted upon said main frame, means for elevating said platform frame, said means including levers having angularly disposed terminal arms which have pivotal connection with both of said frames, and a transversely disposed wheel carried by the rear end of said platform frame, whereon said frame may be swung for changing the direction of travel, said wheel being elevated above the floor when said platform frame is at its upper limit of movement and being lowered into engagement with the floor for assuming supporting relation to the adjacent ends of said frames when said platform frame is lowered.

8. In an elevating truck, a wheeled main frame, an elevatable platform frame mounted upon said main frame, means for elevating said platform frame, said means including levers having angularly disposed terminal arms which have pivotal connection with both of said frames, and a transversely disposed wheel carried by the rear end of said platform frame, whereon said frame may be swung for changing the direction of travel, said wheel being elevated above the floor when said platform frame is at its upper limit of movement and being lowered into engagement with the floor for assuming supporting relation to the adjacent ends of said frames when said platform frame is lowered, the arrangement of said angular arms with respect to said frames being such that when said wheel seats upon the floor they serve to elevate the rear end of said main frame.

In testimony whereof, I affix my signature in presence of two subscribing witnesses.

EMANUEL FORNEY.

Witnesses:
P. G. OTT,
J. W. WARD.